United States Patent
Jacobson et al.

(10) Patent No.: US 8,065,644 B1
(45) Date of Patent: Nov. 22, 2011

(54) REDUCING SUSCEPTIBILITY OF CIRCUIT DESIGNS TO SINGLE EVENT UPSETS

(75) Inventors: Neil G. Jacobson, Los Altos, CA (US); John D. Corbett, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 455 days.

(21) Appl. No.: 12/048,593

(22) Filed: Mar. 14, 2008

(51) Int. Cl.
G06F 9/455 (2006.01)
G06F 17/50 (2006.01)

(52) U.S. Cl. ........ 716/112; 716/106; 716/111; 716/116; 716/117; 716/136

(58) Field of Classification Search .................. 716/1, 2, 716/4, 16, 56, 106, 111, 112, 113, 116, 117, 716/136
See application file for complete search history.

(56) References Cited

U.S. PATENT DOCUMENTS

| | | | |
|---|---|---|---|
| 6,986,078 B2 * | 1/2006 | Rodbell et al. .................. | 714/10 |
| 7,249,010 B1 | 7/2007 | Sundararajan et al. | |
| 2004/0187050 A1 * | 9/2004 | Baumann et al. ............. | 714/704 |
| 2004/0230935 A1 * | 11/2004 | Samudrala et al. ............. | 716/17 |

OTHER PUBLICATIONS

"Estimation of Single Event Upset Probability Impact of FPGA Designs", by Prasanna Sundararajan, Cameron Patterson, Carl Carmichael, Scott McMillan, and Brandon Blodget, by Xilinx, @ Aug. 12, 2003.*
"SEU Mitigation for Sram-Based FPGAs through Dynamic Partial Reconfiguration", by Cristiana Bolchini, Davide Quarta, Marco D. Santambrogio, GLSVLSI'07, Mar. 11-13, 2007, @2007 ACM.*
"Designing Single Event Upset Mitigation Techniques for Large SRAM-based FPGA Devices", Thesis proposal by Fernanda Gusmao de Lima, Feb. 11th, 2002.*
Pratt, Brian et al., "Improving FPGA Design Robustness with Partial TMR," 12th NASA Symposium on VLSI Design, Oct. 4-5, 2005, pp. 1-7, Coeur d'Alene, Idaho.

* cited by examiner

*Primary Examiner* — Thuan Do
*Assistant Examiner* — Nha Nguyen
(74) *Attorney, Agent, or Firm* — Kevin T. Cuenot; Lois D. Cartier

(57) ABSTRACT

A computer-implemented method of reducing susceptibility of a circuit design to single event upsets can include determining a susceptibility level of the circuit design to single event upsets, comparing the susceptibility level with a target susceptibility, and selectively applying a mitigation technique to at least one of a plurality of regions of the circuit design when the susceptibility level of the circuit design exceeds the target susceptibility. The circuit design including the mitigated region can be output.

16 Claims, 1 Drawing Sheet

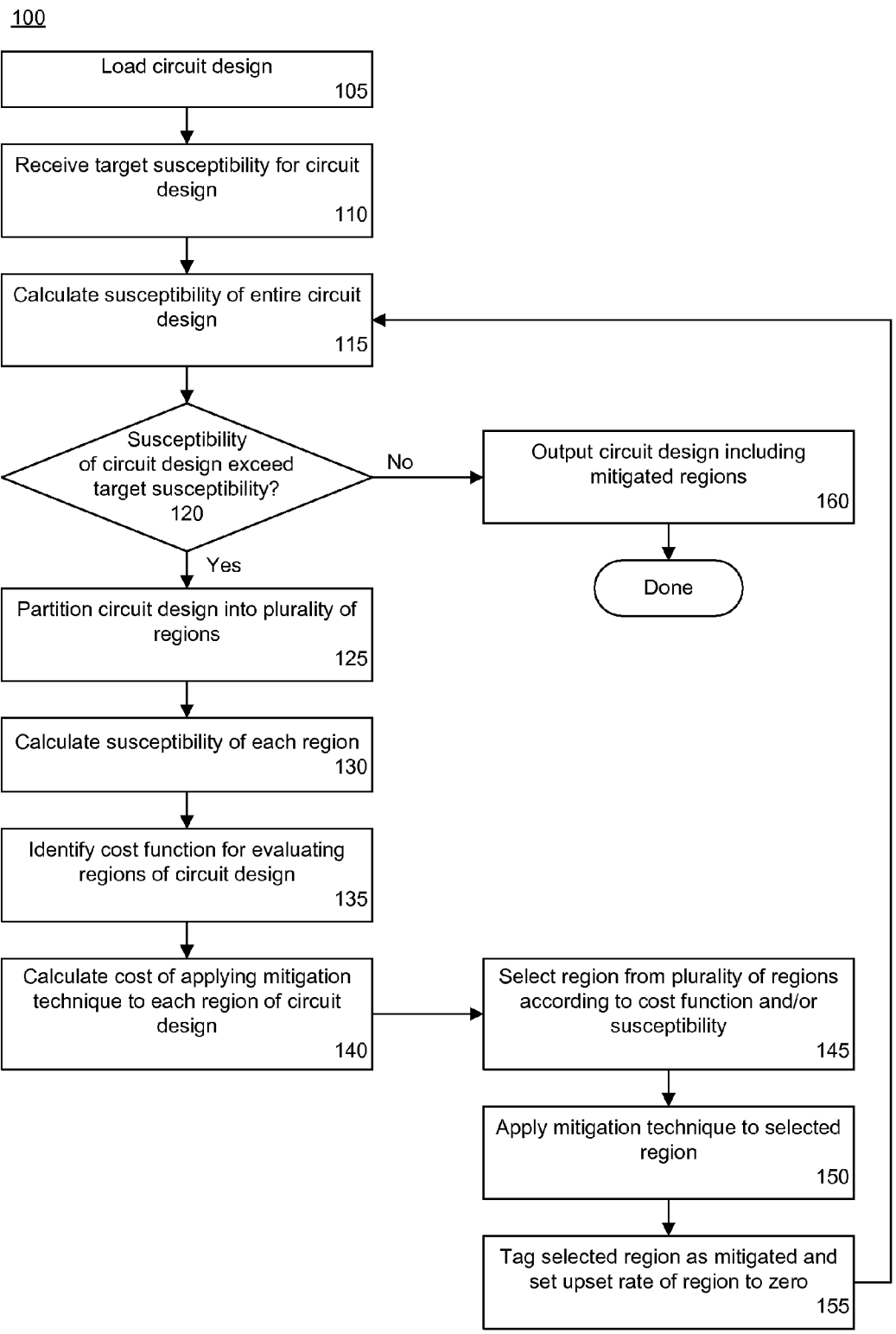

REDUCING SUSCEPTIBILITY OF CIRCUIT DESIGNS TO SINGLE EVENT UPSETS

FIELD OF THE INVENTION

The embodiments disclosed herein relate to integrated circuit devices (ICs). More particularly, the embodiments relate to reducing susceptibility of circuit designs for ICs with respect to single event upsets.

BACKGROUND

A single event upset (SEU) generally refers to a change of state of a memory cell, e.g., a change from zero to one or a change from one to zero. In some cases, this transition is induced by an energetic particle such as a cosmic ray, a proton, or the like, striking a device. SEUs can manifest themselves within digital, analog, and optical components of a system or may have effects in surrounding interface circuitry. SEUs are generally referred to as "soft" errors in that a reset or rewriting of the device typically causes normal device behavior after the occurrence of the SEU. In general, any "soft" malfunction of a bit that causes infrequent errors relative to the rate at which such errors are fixed by mitigation techniques and which has a relatively low correlation between errors can be considered an SEU.

In practical terms, for example, an SEU may cause the state of a switch, e.g., a memory or other charge holding circuit structure, to switch from a zero to a one or from a one to a zero. Such a change in state typically causes an error or system fault. Reloading of the system places the changed switch back into the proper state, such that after reloading or reset, the circuit functions as intended, e.g., error free.

PLDs are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Other types of PLDs include Complex Programmable Logic Devices (CPLDs), Programmable Logic Arrays (PLAs), and Programmable Array Logic (PAL) devices. The terms "PLD" and "programmable logic device" include but are not limited to these exemplary devices, as well as encompassing devices that are only partially programmable. For example, one type of PLD can include a combination of hard-coded transistor logic and a programmable switch fabric that programmably interconnects the hard-coded transistor logic.

For each type of PLD noted above, the functionality of the device is controlled by data bits provided to the device for that purpose. In consequence, the occurrence of an SEU can be particularly troublesome. For example, an unexpected state change within a configuration memory cell may effectively reconfigure an element of the device, e.g., change operation of an AND gate or change the signal flow by altering the programming of a PIP, thereby causing the IC to implement a different function or cause the circuit to fail. Apart from any effects of the malfunction itself, the PLD must be reloaded or reprogrammed to clear the error.

Designing circuits to overcome SEUs traditionally has been the province of the aerospace industry where imperviousness to cosmic rays has been of greater importance than in consumer-oriented applications. Advances in integrated circuit fabrication techniques, e.g., 90, 65, and 45 nanometer processes, have made even consumer-oriented circuits more susceptible to SEUs.

Mitigation refers to the process of designing a circuit to reduce the vulnerability of the circuit to SEUs. One example of a mitigation technique is triplication, where each module of a circuit design is implemented in triplicate. A voting mechanism is employed in the circuit where the majority state or result is passed along as the output. Due to constraints relating to circuit size, power consumption, timing, and the like, triplication or application of another mitigation technique to the entire circuit design is not always feasible. In the case of a PLD, for example, triplicating each portion of a circuit design may result in a design that is too large to fit within one device. This can add cost, increase power consumption, and increase complexity as more than one PLD would be needed to implement the mitigated circuit design.

SUMMARY OF THE INVENTION

The embodiments disclosed herein relate to reducing the susceptibility of circuit designs to single event upsets (SEUs). One embodiment of the present invention can include a computer-implemented method of reducing the susceptibility of a circuit design to SEUs. The computer-implemented method can include determining a susceptibility level of the circuit design to SEUs, comparing the susceptibility level with a target susceptibility, and selectively applying a mitigation technique to at least one of a plurality of regions of the circuit design when the susceptibility level of the circuit design exceeds the target susceptibility. The circuit design, including the mitigated region, can be output.

The computer-implemented method can include calculating a cost of applying a mitigation technique to each of the plurality of regions and selecting a region to be mitigated from the plurality of regions according to the cost calculated for each of the plurality of regions. In one embodiment, selecting a region can include selecting the region having the lowest cost.

The computer-implemented method also can include calculating a susceptibility level for each of the plurality of regions and selecting a region to be mitigated according to the level of susceptibility of each region of the plurality of regions. In one embodiment, selecting a region can include selecting the region having the highest susceptibility.

The computer-implemented method also can include calculating a cost of applying a mitigation technique to each of the plurality of regions and calculating a susceptibility level for each of the plurality of regions. In that case, a region to be mitigated can be selected according to the cost and susceptibility level of each of the plurality of regions.

The computer-implemented method can include iteratively applying the mitigation technique to additional selected regions of the plurality of regions until the susceptibility level of the circuit design does not exceed the target susceptibility. The circuit design can be automatically partitioned into a plurality of partitions or manually partitioned. In another embodiment, for each region to which a mitigation technique is to be applied, the mitigation technique can be selected from a plurality of mitigation techniques.

Another embodiment of the present invention can include a computer-implemented method of reducing susceptibility of a circuit design to SEUs. The computer-implemented method can include identifying a circuit design including a plurality of regions, selecting a region from the plurality of regions for mitigation, and applying a mitigation technique to the selected region. The computer-implemented method can include comparing a susceptibility level of the circuit design to SEUs to a target susceptibility, iteratively applying the mitigation technique to further regions until the susceptibility level does not exceed the target susceptibility, and outputting the circuit design including at least one mitigated region.

In one embodiment, selecting a region can include calculating a cost of applying the mitigation technique to each of the plurality of regions and selecting a region to be mitigated from the plurality of regions according to the cost calculated for each of the plurality of regions. In another embodiment, selecting a region can include calculating a susceptibility level for each of the plurality of regions and selecting a region to be mitigated according to the susceptibility level of each region of the plurality of regions. In still another embodiment, selecting a region can include calculating a cost of applying the mitigation technique to each of the plurality of regions, calculating a susceptibility level for each of the plurality of regions, and selecting a region to be mitigated according to the cost and susceptibility level of each of the plurality of regions.

The computer-implemented method also can include selecting the mitigation technique from a plurality of mitigation techniques for each region to which a mitigation technique is to be applied.

Yet another embodiment of the present invention can include a computer program product including a computer-usable medium having computer-usable program code that, when executed by a data processing system, causes the data processing system to perform the various steps and/or functions disclosed herein.

BRIEF DESCRIPTION OF THE DRAWINGS

The Figure is a flow chart illustrating a method of reducing the susceptibility of a circuit design to single event upsets in accordance with one embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to decreasing the susceptibility of a circuit design to single event upsets (SEUs). In accordance with the embodiments disclosed herein, a circuit design can be partitioned into a plurality of different regions. Using a particular mitigation technique, the circuit design can be processed on a region-by-region basis until the overall circuit design meets an established target susceptibility with respect to SEUs.

An SEU generally refers to an inadvertent or undesired state change with respect to a stored value in a stateful circuit element of an integrated circuit device (IC), e.g., a configuration memory cell of a programmable logic device (PLD). Sometimes an SEU has no effect on the functionality of the circuit design. In other cases, however, an SEU can change the function of an IC such that the circuit implemented in the IC no longer functions properly. As noted, any "soft" malfunction of a bit that causes infrequent errors relative to the rate at which such errors are fixed by mitigation techniques and which has a relatively low correlation between errors can be considered an SEU.

The Figure is a flow chart illustrating a method of reducing the susceptibility of a circuit design to SEUs in accordance with one embodiment of the present invention. The method can be performed by a software-based electronic design automation (EDA) tool executing within a data processing system. Accordingly, the method can begin in a state where an EDA tool is executing within a data processing system and a circuit design is to be evaluated and/or processed to improve susceptibility of that circuit design with respect to SEUs.

In step 105, a circuit design can be loaded into, or otherwise identified by, the EDA tool. As is known, a circuit design can be specified programmatically in the form of one or more hardware description language files, as a netlist, or the like. The circuit design can be a fully implemented circuit design specifying, for example, complete placement and routing information. In step 110, a target susceptibility can be received for the circuit design. The target susceptibility, in general, can specify a minimum desired, or acceptable level, of imperviousness to SEUs. The target susceptibility may be programmed into the EDA tool as a default value or may be a value input by a user.

In step 115, the susceptibility of the entire circuit design can be calculated. In one embodiment, the susceptibility of the circuit design, or any portion thereof, can be estimated according to a ratio of critical bits to total bits needed to configure the target IC, e.g., the IC within which the circuit design will be implemented. As is known, a bitstream, when loaded into a PLD, for example, programs the PLD to implement the circuit design and functionality encoded into the bitstream. The EDA tool can determine, or be programmed with, a mapping of the individual configuration bits to primitives of the target PLD. For example, in the case of a field programmable gate array (FPGA), the EDA tool can be programmed with mapping information linking the bits of the bitstream with primitives, e.g., the underlying circuit structure, in the FPGA fabric.

Each primitive has a particular number of bits from the bitstream that program that primitive, and particularly the circuitry implementing the primitive, to implement a particular function. For example, a particular primitive will be associated with a plurality of configuration bits that, when set or unset in various combinations, configure the primitive to implement a function. One or more of the configuration bits associated with a primitive will be critical in that if such a bit or bits were to change state, the primitive would not likely implement the desired functionality. Other bits associated with primitives will not be critical in that if such a bit or bits were to change, the primitive still would implement the desired functionality.

In general, a "critical bit" can be any bit that, when flipped unintentionally in consequence of an SEU, may or may not result in an incorrect output from the circuit or the primitive that is configured by that bit. By comparison, a "non-critical bit" can be a bit that, when flipped, will not result in an incorrect output from the circuit design or primitive that is controlled by that bit. In other words, a critical bit can be a bit that cannot be definitively identified as a non-critical bit.

In illustration, a plurality of configuration bits selected from the bitstream can be mapped to, e.g., associated with, programmable logic such as a look-up table (LUT) in the fabric of the FPGA. The configuration bits, when loaded into the proper configuration memory cells of the FPGA, configure the LUT to implement a particular function, e.g., a logical AND gate. Of the selected plurality of bits controlling the LUT, one or more will be critical and one or more will be non-critical. Changing any of the critical bit(s), e.g., "care bits," may result in the LUT no longer implementing the logical AND function. Changing one or more of the non-critical configuration bits, e.g., "don't care bits," will not change the function implemented by the LUT. That is, the LUT still will implement the logical AND function. Though a LUT has been used as an example, it should be appreciated that similar analysis may be performed with respect to other logic resources as well as routing primitives, e.g., programmable interconnect points.

In another example, consider the case where a circuit design for an FPGA specifies a particular configuration of a multiplexer circuit element. That multiplexer will be controlled by a particular number of configuration bits, e.g., "N" configuration bits. Of the N configuration bits relating to the multiplexer, a lesser number of bits, e.g., "M" bits, may be determined to have no effect upon the functionality of the multiplexer. Those bits can be considered non-critical bits. The remainder of the N configuration bits can be considered critical bits in that the effect of a flipped critical bit cannot be determined, with absolute certainty, to have no effect upon the intended functionality of the multiplexer, and thus, the overall circuit design.

Procedures such as those described above can be repeated for each primitive or circuit structure of the circuit design. A count of critical bits and non-critical bits can be maintained. It should be appreciated that the particular bits that are critical and non-critical not be determined. Rather, the count of critical bits and/or non-critical bits can be maintained with respect to any given component, portion of the circuit design, or the entire circuit design. Further, the determination of critical and/or non-critical bits is a static process. That is, the process does not entail the passing of test vectors into the circuit design as is the case with respect to conventional fault tolerance analysis.

For the entire circuit design, or any portion thereof, the number of critical bits can be calculated. As the target PLD is known, the total number of configuration bits used or needed to configure the target PLD also is known. It should be appreciated that the "total number of configuration bits" need not be the total number of bits within the configuration bitstream. For example, header bits, memory contents of RAMs that are preloaded as part of the bitstream, and other unused bits may or may not be excluded from calculating the total number of configuration bits. A critical configuration bit ratio can be calculated by dividing the number of critical bits by the total number of configuration bits. The critical configuration bit ratio can be further processed, or included within a calculation, to indicate susceptibility of the circuit design to SEUs.

In one embodiment, for example, the critical configuration bit ratio can be adjusted or multiplied by some factor relating to the frequency of energetic particles colliding with the target PLD. For example, the frequency of such particles striking the earth within an area equivalent to the area of the target device can be used as the factor to adjust the critical configuration bit ratio. This calculation provides an indication of failure rate of the circuit design with respect to SEUs when implemented within a given target PLD, and thus, a measure of susceptibility of the circuit design to SEUs. The factor may be adjusted or scaled according to the actual area occupied by configuration memory cells in the target PLD.

In general, the more critical bits a circuit design has, the higher the susceptibility of the circuit design. The same calculations noted above can be determined or applied to portions of a circuit design. This allows a measure of susceptibility to be calculated not only for the entire circuit design, but also for a portion of a circuit design, e.g., a region or the like. Further details concerning estimating the susceptibility of a circuit design to SEUs can be found within U.S. Pat. No. 7,249,010 to Sundararajan et al., which is fully incorporated herein by reference. It should be appreciated that other methods of determining susceptibility of a circuit design with respect to a given target IC, may be used. Accordingly, the embodiments disclosed herein are not intended to be limited to any particular technique for measuring susceptibility to SEUs.

In step 120, the susceptibility of the circuit design calculated in step 115 can be compared with the target susceptibility. A determination can be made as to whether the susceptibility of the circuit design exceeds the target susceptibility. If not, the method can continue to step 160, where the circuit design can be output and the method can end. Such is the case as the circuit design is considered sufficiently impervious to, or hardened with respect to, the occurrence of SEUs. If the susceptibility of the circuit design does not exceed the target susceptibility, the method can proceed to step 125.

In another embodiment, a further analysis of the circuit design can be performed as to whether application of a mitigation technique to the entire circuit design will result in a circuit design that violates some constraint. For example, application of a mitigation technique such as triplication to the entire circuit design may result in a circuit design that is too large to fit on a single PLD. In that case, selectively applying a mitigation technique to individual regions of the circuit design is desirable. In other cases, application of a mitigation technique to the entire circuit design may result in the circuit design consuming too much power, e.g., violating a power consumption constraint, or violating a timing constraint. In such cases, application of a mitigation technique also can be applied to individual regions of the circuit design in an effort to harden the circuit design while not violating any such constraints. Accordingly, one or more mitigation techniques may be applied to the circuit design selectively according to one or more of these conditions and/or analyses.

In step 125, the circuit design can be partitioned into a plurality of regions. In one embodiment, regions of the circuit design can be manually specified and identified. Such regions may be manually tagged or annotated by developers directly within the circuit design or within another file that is associated with the circuit design.

In another embodiment, the circuit design can be partitioned automatically. For example, the EDA tool can partition the circuit design automatically into regions according to the natural hierarchy of the circuit design, e.g., where each region corresponds to a module, a core, or some other partition or subset of the circuit design. In another example, the circuit design can be partitioned automatically through an analysis of the signal flows within the circuit design. The EDA tool can determine one or more areas or nodes of the circuit design to which signals converge. For example, any area to which more than a minimum number of signals converge may be considered a region.

In step 130, a susceptibility level can be calculated for each region of the plurality of regions of the circuit design. The susceptibility of each region can be calculated generally as described with reference to the entire circuit design, with the exception that the total number of configuration bits can be scaled according to, or set equal to, the number of configuration bits that control programmable logic and routing resources of the target device within the selected region. Similarly, the number of critical bits used in a region specific calculation will reflect only the number of critical bits associated with programmable resources, whether logic or routing resources, of the target IC that are used by the circuit design within the selected region. In addition, any scaling applied to the critical configuration bit ratio for each region can be adjusted according to an estimate of the area that will be needed or consumed by the selected region in its current form, e.g., prior to the application of a mitigation technique, or according to the area occupied by the configuration memory cells responsible for programming that region.

In step 135, a cost function can be identified for use in evaluating regions of the circuit design. The cost function can be used to select a region from the plurality of regions of the circuit design to which a mitigation technique will be applied. The cost function may be a default cost function within the EDA tool or a user specified cost function. In any case, the cost function may include metrics that indicate the change in the state of the circuit design with respect to power, speed, area, and/or the like were a mitigation technique to be applied to the selected region. The cost determined using the cost function can be viewed as a penalty that is incurred in consequence of application of a mitigation technique to the region.

For example, consider the case where the cost function depends solely upon power consumption. In that case, the cost determined from calculating the cost function indicates a penalty that would be incurred as a result of the increase in power consumption by the circuit design or selected region due to triplication of the selected region, e.g., where triple module redundancy is applied. The power consumption cost function can be an estimate that is calculated by the EDA tool using one or more power consumption heuristics, e.g., multiplying the power consumption of the region by a particular factor found to be indicative of the likely increase in power consumption given the size and/or structure of the region to be triplicated and the voting circuitry that would be included.

Taking another example, consider the case where the cost function depends solely upon area. The cost determined from computation of the cost function indicates an area penalty incurred do to increase in area usage by the selected region when triplication is applied to the selected region. Similarly, a cost function depending solely upon timing can indicate a timing penalty incurred as a consequence of application of a mitigation technique to the selected region. In each case, the cost function, whether relating to power consumption, area usage, timing, or any combination thereof, may be automatically computed using one or more heuristics, specific details relating to the existing circuit design, e.g., current overall size, current region size, current power consumption, current timing, etc., as well as any user specified metrics or heuristics.

It should be appreciated that the heuristics used also may vary according to the particular mitigation technique that is applied to a region. For example, particular heuristics may be used to estimate the cost of applying triplication to a region. A different set of heuristics may be used to estimate the cost of using particular cores or standard cell libraries that are considered radiation hardened. Such structures may include a higher degree of redundancy, not necessarily triplication, and incur penalties in terms of increased area usage, power consumption, or reduced timing.

In step 140, the cost of applying a selected mitigation technique to each region of the circuit design can be calculated. More particularly, for each region, the cost of applying a particular mitigation technique, e.g., triplication, to that region can be calculated. Accordingly, a cost will have been determined for each region.

In step 145, a region, not yet mitigated, can be selected from the plurality of regions of the circuit design. The region can be selected according to susceptibility, the cost function, or a combination of both susceptibility and the cost function. It should be appreciated that although susceptibility and the cost function have been described independently, in another embodiment, a cost function can be utilized that incorporates susceptibility as a parameter. In that case, susceptibility of a region need not be considered independently of the cost function as any weighting of susceptibility with regard to other parameters considered in the cost function will be addressed in the cost function itself. In any case, using region susceptibility, the cost function, or some combination of both, allows the EDA tool to select the most susceptible region, the least susceptible region, the region in which application of a mitigation technique would incur the least cost, the most cost, or any combination thereof.

In step 150, the mitigation technique can be applied to the selected region. If the mitigation technique is triplication, the selected region can be triplicated within the circuit design. Additionally, a voting mechanism, e.g., circuitry, can be inserted into the circuit design that passes the majority result of the triplicated region as output. If the mitigation technique involves use of radiation hardened standard cells, e.g., intellectual property (IP) cores, then the various circuit elements of the selected region can be replaced with radiation hardened versions. As other mitigation techniques may be used, the embodiments disclosed herein are not intended to be limited by the particular mitigation technique that is selected.

In step 155, the selected region can be tagged as having been mitigated. An upset rate for the region can be set to zero. The upset rate for the region can be used in lieu of an actual measure of susceptibility for the region when calculating the total susceptibility of the circuit design. Thus, as each region is mitigated, the mitigated, or tagged, regions will not contribute to, or increase, the susceptibility of the entire circuit design. Accordingly, the susceptibility of the entire circuit design will decrease as more regions are mitigated. Tagged or mitigated regions further are not considered for selection during successive iterations of the method.

The method can continue until such time that the susceptibility of the entire circuit design becomes less than or equal to the target susceptibility. When the susceptibility of the circuit design does not exceed the target susceptibility, the circuit design can be output in step 160. Assuming that the circuit design has been processed through at least one iteration of the method, the circuit design will include at least one mitigated region. As used herein, "outputting" and/or "output" can mean, for example, writing to a file, writing to a user display or other output device, sending or transmitting to another system, exporting, storing in memory, or the like.

It should be appreciated that other stopping criteria may be used as well. For example, in cases where the susceptibility of the circuit design is not improving beyond a particular susceptibility level after repeated iterations of the method, the method can end. If the susceptibility only improves a minimal amount, e.g., a minimal percentage from one iteration to the next, the method can end. The method further can end after a maximum amount of time or a maximum number of iterations.

In one embodiment, a mitigation technique may be selected from a plurality of different mitigation techniques for a given region. This would allow one mitigation technique to be applied to one region, and another mitigation technique to be applied to another region. In such an embodiment, heuristics relating to each mitigation technique can be applied to each region to not only calculate costs for each region, but also to calculate a cost for each region for each mitigation technique being considered. For example, a region would have a cost associated with triplication and a cost associated with utilization of a radiation hardened standard cell library. In this manner, the mitigation technique having the lowest cost penalty can be considered. Then, the region with the lowest cost or lowest cost in combination with some measure of susceptibility may be selected, which in turn chooses a particular mitigation technique to be applied to the selected region.

It should be appreciated that the embodiments disclosed herein may also be applied to other types of IC, e.g., application specific integrated circuits (ASICs), where improved susceptibility to SEUs, in general, is desired. The susceptibility of the circuit design may be evaluated and a mitigation technique that is suitable for the type of IC being considered can be used. Still, as noted, more than one mitigation technique may be selected and applied among different regions.

The flowchart in the figure illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical functions.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

A data processing system, e.g., a computer, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, or the like.

The terms "computer program," "software," "application," "computer-usable program code," variants and/or combinations thereof, in the present context, mean any expression, in any language, code or notation, of a set of instructions intended to cause a system having a data processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:
1. A computer-implemented method of reducing susceptibility of a circuit design to single event upsets comprising:
 determining a susceptibility level of the circuit design to single event upsets according to a ratio of critical configuration bits to total configuration bits of the circuit design;

scaling the susceptibility level of the circuit design according to actual area occupied by configuration memory cells of the integrated circuit within which the circuit design to be implemented;

scaling the susceptibility level of the circuit design according to a frequency at which particles responsible for single-event upsets strike an area corresponding to an area occupied by an integrated circuit within which the circuit design is to be implemented;

comparing, via a computer, the susceptibility level with a target susceptibility;

selectively applying a mitigation technique to at least one of a plurality of regions of the circuit design when the susceptibility level of the circuit design exceeds the target susceptibility; and outputting the circuit design comprising the mitigated region.

2. The computer-implemented method of claim 1, further comprising:

calculating a cost incurred in consequence of applying a mitigation technique to each of the plurality of regions, wherein the cost is calculated in terms of a circuit metric; and selecting a region to be mitigated from the plurality of regions according to the cost calculated for each of the plurality of regions.

3. The computer-implemented method of claim 1, further comprising:

calculating a susceptibility level for each of the plurality of regions, wherein for each region, the susceptibility level is determined according to a ratio of critical configuration bits to total configuration bits of the region; and selecting a region to be mitigated according to the level of susceptibility of each region of the plurality of regions.

4. The computer-implemented method of claim 3, further comprising:

for each region, scaling the susceptibility level of each of the plurality of regions according to actual area occupied by configuration memory cells that configure the region of the integrated circuit within which the circuit design is to be implemented.

5. The computer-implemented method of claim 1, further comprising:

calculating a cost incurred in consequence of applying a mitigation technique to each of the plurality of regions, wherein the cost is calculated in terms of a circuit metric;

calculating a susceptibility level for each of the plurality of regions; and selecting a region to be mitigated according to the cost and susceptibility level of each of the plurality of regions.

6. The computer-implemented method of claim 1, further comprising iteratively applying the mitigation technique to additional selected regions of the plurality of regions until the susceptibility level of the circuit design does not exceed the target susceptibility.

7. The computer-implemented method of claim 1, further comprising automatically partitioning the circuit design into the plurality of regions.

8. The computer-implemented method of claim 1, further comprising, for each region to which a mitigation technique is applied, calculating a cost of applying a first mitigation technique to the region, calculating a cost of applying a second mitigation technique to the region in lieu of the first mitigation technique, and selecting the first or the second mitigation technique to be applied to the region according to lowest cost.

9. A computer program product embodied on a computer-usable medium, the computer product comprising:

a non-transitory computer-usable medium that reduces susceptibility of a circuit design to single event upsets, the non-transitory computer-usable medium comprising:

computer-usable program code that determines a susceptibility level of the circuit design to single event upsets determined according to a ratio of critical configuration bits to total configuration bits of the circuit design;

scaling the susceptibility level of the circuit design according to actual area occupied by configuration memory cells of the integrated circuit within which the circuit design to be implemented;

scaling the susceptibility level of the circuit design according to a frequency at which particles responsible for single-event upsets strike an area corresponding to an area occupied by an integrated circuit within which the circuit design is to be implemented;

computer-usable program code that compares the susceptibility level with a target susceptibility;

computer-usable program code that selectively applies a mitigation technique to at least one of a plurality of regions of the circuit design when the susceptibility level of the circuit design exceeds the target susceptibility; and computer-usable program code that outputs the circuit design comprising the mitigated region.

10. The computer program product of claim 9, further comprising:

computer-usable program code that calculates a cost incurred in consequence of applying a mitigation technique to each of the plurality of regions, wherein the cost is calculated in terms of a circuit metric; and computer-usable program code that selects a region to be mitigated from the plurality of regions according to the cost calculated for each of the plurality of regions.

11. The computer program product of claim 9, further comprising:

computer-usable program code that calculates a susceptibility level for each of the plurality of regions, wherein for each region, the susceptibility level is determined according to a ratio of critical configuration bits to total configuration bits of the region; and computer-usable program code that selects a region to be mitigated according to the level of susceptibility of each region of the plurality of regions.

12. The computer program product of claim 9, further comprising:

computer-usable program code that calculates a cost incurred in consequence of applying a mitigation technique to each of the plurality of regions, wherein the cost is calculated in terms of a circuit metric;

computer-usable program code that calculates a susceptibility level for each of the plurality of regions; and computer-usable program code that selects a region to be mitigated according to the cost and susceptibility level of each of the plurality of regions.

13. The computer program product of claim 9, further comprising computer-usable program code that, for each region to which a mitigation technique is applied, calculates a cost of applying a first mitigation technique to the region, calculates a cost of applying a second mitigation technique to the region in lieu of the first mitigation technique, and selects the first or the second mitigation technique to be applied to the region according to lowest cost.

14. A computer-implemented method of reducing susceptibility of a circuit design to single event upsets comprising:

determining a susceptibility level of the circuit design to single event upsets according to a ratio of critical configuration bits to total configuration bits of the circuit design; scaling the susceptibility level of the circuit design according to actual area occupied by configuration memory cells of the integrated circuit within which the circuit design is to be implemented;

scaling the susceptibility level of the circuit design according to a frequency at which particles responsible for single-event upsets strike an area corresponding to an area occupied by an integrated circuit within which the circuit design is to be implemented;

for each of a plurality of regions of a circuit design, calculating a cost of applying a first mitigation technique to the region and calculating a cost of applying a second mitigation technique to the region in lieu of the first mitigation technique;

comparing, via a computer, the susceptibility level with a target susceptibility;

for at least one of the plurality of regions, selecting the first or the second mitigation technique according to lowest cost and applying the selected mitigation technique to the region when the susceptibility level of the circuit design exceeds the target susceptibility; and outputting the circuit design comprising the mitigated region.

15. The computer-implemented method of claim 14, further comprising:

for each region, scaling the susceptibility level of each of the plurality of regions according to actual area occupied by configuration memory cells that configure the region of the integrated circuit within which the circuit design is to be implemented.

16. The computer-implemented method of claim 14, further comprising:

calculating a susceptibility level for each of the plurality of regions, wherein for each region, the susceptibility level is determined according to a ratio of critical configuration bits to total configuration bits of the region; and selecting a region to be mitigated according to the level of susceptibility of each region of the plurality of regions.

* * * * *